United States Patent [19]

Roberts

[11] Patent Number: 5,399,188
[45] Date of Patent: Mar. 21, 1995

[54] ORGANIC EMISSIONS ELIMINATION APPARATUS AND PROCESS FOR SAME

[75] Inventor: Daryl L. Roberts, Winchester, Mass.

[73] Assignee: Gas Research Institute, Chicago, Ill.

[21] Appl. No.: 160,431

[22] Filed: Dec. 1, 1993

[51] Int. Cl.$^6$ ............ B01D 53/22; B01D 53/26; B01D 63/02
[52] U.S. Cl. .................. 95/52; 95/180; 95/186; 95/193; 95/231
[58] Field of Search ............ 95/43, 45, 52, 179, 95/180, 186, 193, 231; 96/4, 7, 8, 10

[56] References Cited

U.S. PATENT DOCUMENTS

| | | | |
|---|---|---|---|
| 2,235,322 | 3/1941 | Martin | 95/231 X |
| 3,255,573 | 6/1966 | Cox, Jr. | 95/231 X |
| 3,616,598 | 11/1971 | Foral, Jr. | 95/193 X |
| 3,736,725 | 6/1973 | Alleman et al. | 55/32 |
| 3,911,080 | 10/1975 | Mehl et al. | 95/45 X |
| 4,497,640 | 2/1985 | Fournié et al. | 55/16 |
| 4,783,201 | 11/1988 | Rice et al. | 55/16 |
| 4,857,081 | 8/1989 | Taylor | 95/52 |
| 4,900,448 | 2/1990 | Bonne et al. | 95/52 X |
| 4,915,838 | 4/1990 | Bonne et al. | 95/52 X |
| 4,942,135 | 7/1990 | Zaromb | 95/45 X |
| 4,978,430 | 12/1990 | Nakagawa et al. | 203/14 |
| 5,034,025 | 7/1991 | Overmann, III | 95/52 |
| 5,067,971 | 11/1991 | Bikson et al. | 55/16 |
| 5,147,549 | 9/1992 | Chou et al. | 210/640 |
| 5,167,675 | 12/1992 | Rhodes | 95/231 X |
| 5,236,474 | 8/1993 | Schofield et al. | 95/52 X |
| 5,281,254 | 1/1994 | Birbara et al. | 96/7 X |

FOREIGN PATENT DOCUMENTS

| | | | |
|---|---|---|---|
| 3818919 | 12/1989 | Germany | 95/52 |
| 53-007578 | 1/1978 | Japan | 95/45 |
| 54-001284 | 1/1979 | Japan | 96/4 |
| 54-006168 | 1/1979 | Japan | 96/8 |
| 59-160518 | 9/1984 | Japan | 96/4 |
| 61-004528 | 1/1986 | Japan | 96/4 |
| 01-056118 | 3/1989 | Japan | 96/4 |
| 01-218681 | 8/1989 | Japan | 96/4 |
| 03-032718 | 2/1991 | Japan | 96/4 |
| 2252738 | 8/1992 | United Kingdom | 95/193 |
| WO93/10889 | 6/1993 | WIPO | 95/186 |

Primary Examiner—Robert H. Spitzer
Attorney, Agent, or Firm—Dick and Harris

[57] ABSTRACT

An organic emissions elimination apparatus, and process for same, for substantially eliminating the emission of potentially harmful organic constituents, such as benzene, toluene and xylene ("BTX") into the ambient environment during dehydration of water bearing gas. The apparatus includes a first chamber which incorporates a membrane for use in association with a water absorbing material (such as triethylene glycol) which is operably displaceable and retained within the membrane fibers. Although the water vapors from the gas will permeate the membrane (and become absorbed by the triethylene glycol), the BTX will not be able to permeate the membrane. Accordingly, the BTX and the dehydrated gas will be discharged from the first chamber toward a point of use by conventional dehydrated gas using equipment. However, the glycol, and the water vapors absorbed therein, will be transmitted to a regenerator for separation therebetween—wherein the separated water vapors (without any BTX) will be discharged into the ambient environment, and the separated triethylene glycol will be reintroduced into the first chamber.

6 Claims, 1 Drawing Sheet

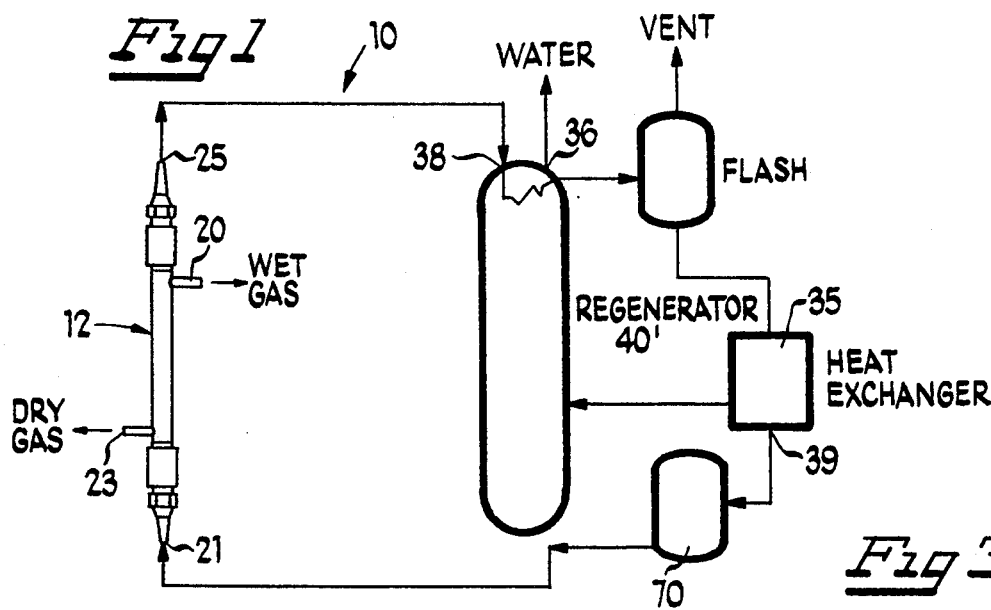
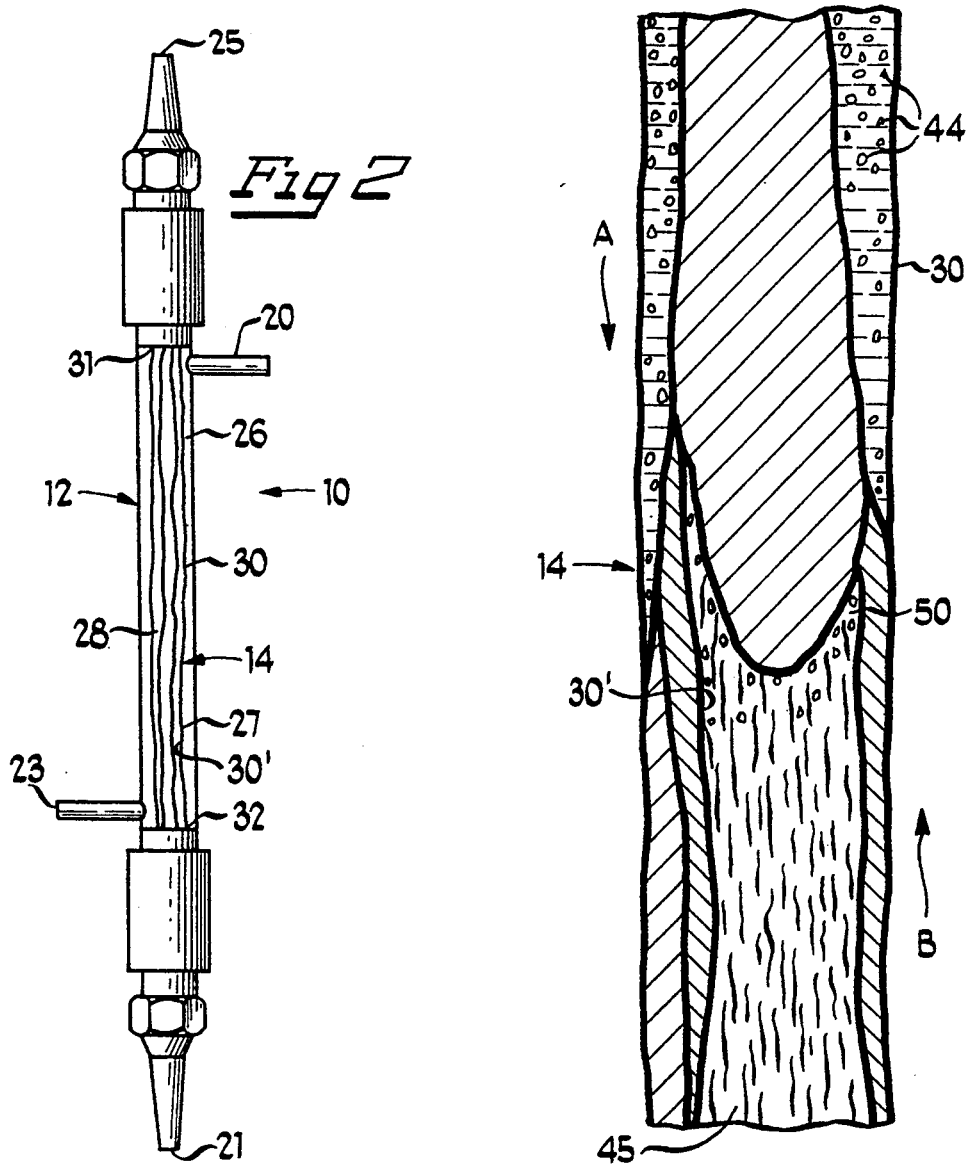

ORGANIC EMISSIONS ELIMINATION APPARATUS AND PROCESS FOR SAME

BACKGROUND OF THE INVENTION

1. Field of the Invention

This invention relates generally to apparatuses and processes for the dehydration of water bearing gases (such as methane), and, more particularly to an organic emissions elimination apparatus and process for same for use in substantially eliminating the emission of potentially harmful organic constituents, such as benzene, toluene and xylene ("BTX") into the ambient environment during the dehydration of such gases.

2. Background Art

Dehydration of water bearing gas (such as natural gas) has been known in the art for many years. In addition, inasmuch as such gas typically contains trace amounts of potentially harmful organic constituents (such as BTX), the prior art has addressed concerns relative to the emission of such constituents into the ambient environment, during the dehydration process.

Indeed, in some of such prior art, the water bearing gas is forced into a membrane module either under the natural pressure of the gas, or, alternatively, through the use of a compressor, or the like. The membrane module includes a membrane which is substantially impermeable to the BTX (which may be found within the water bearing gas), while being substantially permeable to the water vapor, and, somewhat permeable to the gas itself. Accordingly, the "permeate stream," which will result within the membrane will typically comprise water vapor and some "lost" gas (which has permeated the membrane). This permeate stream is then discharged from the membrane module and into the ambient environment. However, the gas which has not permeated the membrane (the "dehydrated gas"), and the BTX, are discharged from the membrane module to a point of use by conventional gas burning equipment. Although some of the "lost" gas included in the permeate stream can be separated from the water vapor prior to discharge into the ambient ,environment, and then reintroduced into the membrane module (through conventional regeneration equipment), the capital cost of such equipment necessary for such reintroduction is too expensive to be practical.

Additional prior art dehydration devices and/or methods have alternatively utilized a water absorbing material, such as triethylene glycol ("glycol") as a dehydration agent—without the use, or cooperation with, a membrane or membrane module. Indeed, in such prior art devices and/or methods, the water bearing gas, and the glycol, are introduced into a first chamber. As the water bearing gas and the glycol come into contact with each other, the water vapor in the gas, negligible amounts of the gas itself, as well as some of the BTX, will be absorbed by the glycol. The non-absorbed gas (the "dehydrated" gas) will then be discharged from the first chamber toward a point of use by conventional gas using equipment.

The "absorbed stream" in the first chamber (which includes the glycol, water vapor and BTX) will be transferred to a regenerator where the glycol will be separated from the water and the BTX, and then the glycol will be reintroduced back into the first chamber. The remaining water vapor, and unfortunately, the potentially harmful BTX (both of which have been separated from the glycol) will be either directly, or indirectly, emitted into the ambient environment.

SUMMARY OF THE INVENTION

The present invention comprises an organic emissions elimination apparatus for use in substantially eliminating the emission of potentially harmful organic constituents, such as benzene, toluene and xylene (BTX), into the ambient environment during dehydration of water bearing gas. The apparatus comprises a first chamber having a water bearing gas inlet, a water absorbing material inlet for the introduction of the water absorbing material, a dehydrated gas outlet and a water absorbed solution outlet. Separation means are operably positioned within the first chamber for separating out the water from the water bearing gas, to in turn, generate a water absorbed solution, comprised substantially of the water and the water absorbing material, while also generating dehydrated gas having various amounts of organic constituents therein, operably separated from the water absorbed solution.

The dehydrated gas, and, in turn, the various amounts of organic constituents therein, are operably discharged from the first chamber through the gas outlet toward a point of use by conventional dehydrated gas using equipment. The water absorbed solution is operably discharged from the first chamber through the water absorbed solution outlet.

A second chamber is operably connected to the water absorbed solution outlet of the first chamber. Such a connection enables the water absorbed solution to be operably transferred from the first chamber and into the second chamber. The second chamber includes solution separating means for operably separating the water from the water absorbed solution, and, a water outlet for enabling discharge of the water into the ambient environment.

In the preferred embodiment of the invention, the separation means comprises a membrane which is substantially impermeable to the water absorbing material and which is substantially permeable to the water in the water bearing gas. The water absorbing material serves to operably absorb the water which has permeated into the membrane to, in turn, create the water absorbed solution. The membrane retains the water absorbed solution until the water absorbed solution is operably discharged from the water absorbed solution outlet in the first chamber.

The membrane comprises membrane fibers and outer and inner membrane wall surfaces. The water absorbing material is operably distributed within the membrane fibers upon introduction of the water absorbing material into the first chamber through the water absorbing material inlet. The water absorbing material and, in turn, the water from the water bearing gas which has permeated through the membrane wall surfaces of the membrane, and, which has been absorbed by the water absorbing material (so as to create the water absorbed solution), is collectively discharged through the water absorbed solution outlet toward and into the second chamber. The membrane may comprise a polymer material from the group consisting of glassy polymers, such as cellulose acetate—although other types of membranes which can withstand constant contact with the particular water absorbing material; which are substantially impermeable to various aromatic compounds found in natural gas (such as BTX); and which are permeable to water, are also contemplated for use.

The organic emission elimination apparatus further includes regeneration means operably associated with the second chamber for regenerating the water absorbing material from the second chamber back into the first chamber, after the water has been operably separated from the water absorbing material. The water absorbing material may comprise triethylene glycol, although other water absorbing materials which absorb water, but which will substantially not absorb slowly or moderately permeable constituents, such as methane gas, are also contemplated for use.

The invention additionally includes a process for substantially eliminating the emission of various potentially harmful organic constituents, such as benzene, toluene and xylene, into the ambient environment during the dehydration of water bearing gas. The process comprises the steps of a) introducing the water absorbing material into membrane fibers of a membrane which are operably positioned within a first chamber, through a water absorbing material inlet; b) introducing a water bearing gas within the first chamber through a water bearing gas inlet; c) permeating the water in the water bearing gas through at least a portion of the membrane and, in turn, into operable contact with the water absorbing material within the membrane fibers; d) absorbing the water into the water absorbing material so as to result in a water absorbed solution operably displaceable within the membrane fibers; e) obstructing absorption of the gas and the other various organic constituents within the gas from absorption by the water absorbing material; and f) discharging the gas and the various organic constituents of the gas out of the dehydrated gas outlet in the first chamber toward a point of use by conventional dehydrated gas using equipment.

The process further comprises the steps of displacing the water absorbed solution out of the water absorbed solution outlet in the first chamber, and, introducing the displaced water absorbed solution into a second chamber, after the step of absorbing the water by the water absorbing material.

In this preferred embodiment, the process additionally includes the step of separating the water and the water absorbing material from the water absorbed solution in the second chamber and then discharging the separated water into the ambient environment.

The process further includes the step of regenerating the separated water absorbing material from the second chamber for retransmission back into the membrane fibers of the membrane within the first chamber—toward further absorption of water from further water bearing gas being introduced into the first chamber.

The process additionally includes the step of introducing either the water absorbing material or the water bearing gas proximate to the top end of the first chamber and introducing the other one of the water absorbing material and the water bearing gas proximate the bottom end of the first chamber.

BRIEF DESCRIPTION OF THE DRAWINGS

FIG. 1 of the drawings is a schematic diagram of the organic emissions elimination apparatus showing, in particular, the operable association between the first chamber and the second chamber;

FIG. 2 of the drawings is an elevated enlarged front view of the first chamber showing, in particular, the water bearing gas inlet, the water absorbing material inlet, the dehydrated gas outlet, the water absorbed solution outlet and the separation means operably positioned within the first chamber; and FIG. 3 of the drawings is an enlarged cross-sectional view of the separation means of FIG. 2 showing, in particular, the water vapor from the water bearing gas which has begun permeating the membrane wall surfaces, as well as showing the operable flow of the water absorbing material toward eventual absorption of the water vapor.

DETAILED DESCRIPTION OF THE DRAWINGS

While this invention is susceptible of embodiment in many different forms, there is shown in the drawings and will herein be described in detail, one specific embodiment with the understanding that the present disclosure is to be considered as an exemplification of the principals of the invention and is not intended to limit the invention to the embodiment illustrated.

Organic emissions elimination apparatus 10 is shown in FIG. 1 and FIG. 2 as including first chamber 12, separation means 14 (FIG. 2) and second chamber 16 (FIG. 1). First chamber 12 includes water bearing gas inlet 20, water absorbing material inlet 21, dehydrated gas outlet 23, water absorbed solution outlet 25, and an interior channel 26 (FIG. 2). As will be explained in detail, a water bearing gas, such as natural gas ("methane"), will be introduced into the first chamber through water bearing gas inlet 20; a water absorbing material 45 (FIG. 3), such as triethylene glycol, will be introduced into the first chamber through water absorbing material inlet 21; the dehydrated gas (not shown), which will become dehydrated within the first chamber, will be discharged from the first chamber through dehydrated gas outlet 23; and, the water absorbed solution 50 (FIG. 3), which comprises the triethylene glycol and the water from the natural gas, will be operably discharged from the first chamber through water absorbed solution outlet 25.

Separation means 14 is shown in FIG. 2 and FIG. 3 as comprising a membrane having membrane fibers, such as membrane fibers 27 and 28 (FIG. 2), outer membrane wall surface 30, inner membrane wall surface 30', distal end region 31 (FIG. 2) and proximal end region 32 (FIG. 2). Distal end region 31 is positioned in operable cooperation with water absorbed solution outlet 25, and, proximal end region 32 is positioned in operable cooperation with water absorbing material inlet 21. Such operable positioning enables the water absorbing material to be introduced directly into the lumen of the membrane fibers (so as to substantially eliminate migration outside of the fibers) while additionally enabling water absorbed solution 50 (as will be explained) to be discharged out of water absorbed solution outlet 25—wherein neither the water absorbing material, nor the water absorbed solution will permeate the outer and/or inner membrane wall surfaces 30, 30', respectively of the membrane.

As shown in FIG. 2, separation means 14 is operably positioned within first chamber 12, and, in turn, in operable alignment relative to water bearing gas inlet 20, water absorbing material inlet 21, dehydrated gas outlet 23 and water absorbed solution outlet 25. It is contemplated that separation means 14 ("membrane") be constructed from a polymer material from the group consisting of glassy polymers, such as cellulose acetate—although any other membrane material which can withstand constant contact with the water absorbing material (such as triethylene glycol), which will allow the permeation of water, yet substantially retain various harmful constituents of natural gas (such as BTX), are also contemplated for use. Some of such membranes having these characteristics are commercially available from a company by the name of W. R. Grace and Company.

Second chamber 16 is shown in FIG. 1 as including solution separating means 35, water outlet 36, water absorbed solution inlet 38, separated water absorbing material outlet 39 and regenerating means 40. The solution separating means, along with the regenerating means, are commercially available and their operation will be understood to those in the art. As shown in FIG. 1, water absorbed solution inlet 38 is operably associated with water absorbed solution outlet 25 of first chamber 12, and separated water absorbing material outlet 39 is operably associated with water absorbing material inlet 21 of the first chamber.

In operation, water absorbing material 45 (FIG. 3) is pumped into membrane fibers, such as membrane fibers 27 and 28 (FIG. 2 and FIG. 3), by way of pump 70 (FIG. 1), into and through water absorbing material inlet 21 of first chamber 12. Indeed, the pump forces the water absorbing material ("triethylene glycol") through membrane fibers 27, 28, so that it flows toward distal end region 31 of the membrane, out of water absorbed solution outlet 25, and eventually into second chamber 16—wherein the water absorbing material, in and by itself, will be recirculated back into first chamber 12 through water absorbing material inlet 21. Although triethylene glycol has been identified as the water absorbing material, other conventional water absorbing materials which are considered not to permeate membrane 14 and which will not absorb slowly or moderately permeable constituents such as methane, are also contemplated for use.

After the flowing water absorbing material has occupied membrane fibers 27, 28, a water bearing gas, such as methane, is introduced into first chamber 12 through water bearing gas inlet 20. As the water bearing gas enters interior channel 26 (FIG. 2) of the first chamber, it will begin to surround, or bathe, outer membrane wall surface 30 of the membrane. Inasmuch as the water bearing gas is introduced near distal end 31 of the membrane, the gas will be forced to travel in the direction of the arrow "A" (FIG. 3) and, in turn, towards dehydrated gas outlet 23 (FIG. 2). At the same time, water absorbing material 45 (FIG. 3) will be flowing in the opposite direction (as shown by arrow "B" (FIG. 3)) of the water bearing gas. Although the water bearing gas and the water absorbing material have been shown as being introduced at, or near, opposite ends of the first chamber, other orientations and/or locations relative to their respective introductions into the first chamber are also contemplated.

As the water bearing gas continues to bathe outer membrane wall surface 30, the water vapor 44 (FIG. 3) within the gas, along with some of the gas itself, will begin to permeate outer and inner membrane wall surfaces 30, 30' respectively, of the membrane, where they will eventually come into contact with the water absorbing material 45 flowing through membrane fibers 27, 28. Although the water vapor, and some of the gas will permeate the outer and inner membrane wall surfaces of the membrane, various potentially harmful aromatic compounds (such as BTX) which are typically found in trace amounts in the water bearing gas as it is being introduced into the first chamber, will be substantially precluded from permeating the membrane. As a result, such potentially harmful compounds will not come into contact with the water absorbing material within the membrane fibers, and, accordingly, they will not be discharged as part of the water absorbed solution toward and into second chamber 16.

Furthermore, while water absorbing material 45 (FIG. 3) will indeed absorb water, it substantially does not absorb slowly or moderately permeable constituents, such as methane gas. Indeed, because of the presence of the membrane, there will be substantially less absorption of methane than would otherwise occur in the absence of the membrane. Additionally, substantially all of the water vapor will become absorbed by the water absorbing material to, in turn, result in water absorbed solution 50 (FIG. 3) which will be collectively precluded from permeating the membrane wall surfaces.

After the water vapor has been absorbed by the water absorbing material, the remaining dehydrated gas ("methane"), along with the potentially harmful BTX constituents, will be operably discharged through dehydrated gas outlet 23 of first chamber 12 toward a point of use by conventional dehydrated gas using equipment. The water absorbed solution 50 (which does not contain any BTX, among other things—inasmuch as membrane 14 is substantially impermeable to BTX) will be operably discharged through water absorbed solution outlet 25 of first chamber 12, and, eventually into second chamber 16 through water absorbed solution inlet 38.

After water absorbed solution 50 has been operably introduced into second chamber 16, the water, and the water absorbing material, will be separated from each other through conventional solution separating means 35—e.g. through heating the water absorbed solution to, in turn, cause the solution to emit water vapors therefrom—toward eventual safe (and BTX free) discharge of the water into the ambient environment. Once the water has been separated from the water absorbing material in the second chamber, the separated water absorbing material will then be reintroduced back into first chamber 12 through water absorbing material inlet 21—wherein the entire ongoing dehydration process will continue.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

I claim:

1. A process for substantially eliminating the emission of various potentially harmful organic constituents into the ambient environment during the dehydration of water bearing gas, the process comprising the steps of:

introducing a water absorbing material into membrane fibers of a membrane operably positioned within a first chamber, through a water absorbing material inlet;

introducing a water bearing gas within said first chamber through a water bearing gas inlet;

permeating the water in the water bearing gas through at least a portion of said membrane and, in turn, into operable contact with the water absorbing material within the membrane fibers;

absorbing the water into the water absorbing material so as to result in a water absorbed solution operably displaceable within the membrane fibers;

obstructing absorption of the gas and the other various organic constituents within the gas from absorption by the water absorbing material; and discharging the gas and the various organic constituents of the gas out of a dehydrated gas outlet in the first chamber toward a point of use by conventional dehydrated gas using equipment.

2. The invention according to claim 1 wherein the process for substantially eliminating transmission of various potentially harmful organic constituents, into the ambient environment during dehydration of water bearing gas further comprises the steps of:

displacing the water absorbed solution out of a water absorbed solution outlet in the first chamber; and introducing the displaced water absorbed solution into a second chamber after the step of absorbing the water into the water absorbing material.

3. The invention according to claim 2 in which the process for substantially eliminating the emission of various potentially harmful organic constituents into the ambient environment during the dehydration of water bearing gas further comprises the step of separating the water from the water absorbing material in the water absorbed solution in said second chamber.

4. The process according to claim 3 in which the process for separating the water from the water absorbing material in the water absorbed solution further includes the step of discharging the separated water into the ambient environment.

5. The process according to claim 3 wherein the step of separating the water from the water absorbing material in the water absorbed solution further includes the step of regenerating the separated water absorbing material from said second chamber for retransmission into the membrane fibers of the membrane within the first chamber, towards further absorption of water from further water bearing gas being introduced into the first chamber.

6. The process according to claim 1 wherein the first chamber has a top end and a bottom end opposite the top end:

the steps of introducing the water absorbing material and the water bearing gas into the first chamber further includes the steps of introducing one of the water absorbing material and the water bearing gas proximate to the top end of the first chamber and introducing the other one of the water absorbing material and the water bearing gas proximate to the bottom end of the first chamber.

* * * * *